US012617002B2

(12) United States Patent

Furstenburg

(10) Patent No.: US 12,617,002 B2

(45) Date of Patent: May 5, 2026

(54) SPORTS TOWEL WITH INTEGRAL SQUEEGEE WIPING SURFACE

(71) Applicant: Matthew Furstenburg, Parkland, FL (US)

(72) Inventor: Matthew Furstenburg, Parkland, FL (US)

( * ) Notice: Subject to any disclaimer, the term of this patent is extended or adjusted under 35 U.S.C. 154(b) by 478 days.

(21) Appl. No.: 18/124,330

(22) Filed: Mar. 21, 2023

(65) Prior Publication Data

US 2024/0017297 A1 Jan. 18, 2024

Related U.S. Application Data

(60) Provisional application No. 63/321,912, filed on Mar. 21, 2022.

(51) Int. Cl.

| | |
|---|---|
| ***A47L 13/12*** | (2006.01) |
| ***A47L 1/16*** | (2006.01) |
| ***B08B 1/14*** | (2024.01) |
| ***B08B 1/16*** | (2024.01) |

(52) U.S. Cl.

CPC ................ *B08B 1/143* (2024.01); *A47L 1/16* (2013.01); *A47L 13/12* (2013.01); *B08B 1/165* (2024.01)

(58) Field of Classification Search

CPC ......... B08B 1/143; B08B 1/005; A47L 13/12; A47L 1/16

See application file for complete search history.

(56) References Cited

U.S. PATENT DOCUMENTS

| | | | | | |
|---|---|---|---|---|---|
| 2,682,678 | A | * | 7/1954 | Kingman ................ | A47L 13/16 15/118 |
| 2,910,710 | A | | 11/1959 | Corrington et al. | |
| 5,075,918 | A | * | 12/1991 | Zeltner .................. | A63B 57/60 15/210.1 |
| 5,331,705 | A | * | 7/1994 | Melov ..................... | A47L 25/00 15/118 |

(Continued)

FOREIGN PATENT DOCUMENTS

| | | |
|---|---|---|
| CN | 207736861 U | 8/2018 |
| CN | 209712787 U | 12/2019 |

OTHER PUBLICATIONS

Dickssportinggoods.com [online], "Nike football towel," retrieved from URL <https://www.dickssportinggoods.com/p/nike-football-towel-16nikunkftblltwlxfta/16nikunkftblltwlxfta?sku=12305701&camp=CSE:DSG_92700058480792790_pla_pla->, dated Feb. 2022, 6 pages.

*Primary Examiner* — Michael D Jennings

(74) *Attorney, Agent, or Firm* — Whiteford, Taylor & Preston, LLP; Gregory M. Stone

(57) ABSTRACT

A sports towel includes an integrated, semi-rigid squeegee tab along one edge of the towel. The squeegee tab is tapered along its outer edge, allowing for effective wiping of planar surfaces such as the visor on a sporting helmet. The towel is securely attached to the squeegee tab through a double stitch that extends through a folded-over edge of the towel and a towel-receiving slot on the top of the squeegee tab. An indicia-receiving slot on the top side of the squeegee tab provides an opportunity for product branding or logo placement. Additionally, the towel includes hook-and-loop material to allow for easy attachment to a player's uniform. The invention offers a convenient and efficient solution for athletes to keep their helmet visors clean and dry during gameplay.

19 Claims, 2 Drawing Sheets

(56) References Cited

U.S. PATENT DOCUMENTS

| | | | | |
|---|---|---|---|---|
| 6,202,246 | B1 * | 3/2001 | Boucher | A46B 9/06 15/115 |
| 7,302,728 | B2 * | 12/2007 | Kunz | A63B 57/60 15/210.1 |
| 7,739,768 | B2 | 6/2010 | Gavney, Jr. | |
| 8,172,300 | B2 | 5/2012 | McCormick et al. | |
| 9,162,125 | B1 * | 10/2015 | McBryde | A46B 5/0008 |
| 9,265,394 | B2 | 2/2016 | Van Der Kooi et al. | |
| D770,813 | S * | 11/2016 | Furstenburg | D6/608 |
| 10,821,481 | B1 * | 11/2020 | Lesic | B32B 7/08 |
| 11,066,049 | B2 * | 7/2021 | Velazquez | B60S 3/002 |
| 2003/0233717 | A1 * | 12/2003 | Ortega | A47K 10/02 15/118 |
| 2004/0261207 | A1 | 12/2004 | Gavney | |
| 2009/0185851 | A1 | 7/2009 | Mapalo et al. | |
| 2010/0115723 | A1 | 5/2010 | Mapalo et al. | |
| 2016/0334584 | A1 * | 11/2016 | Stamps | G02B 6/3866 |
| 2017/0266523 | A1 * | 9/2017 | Williams | A63B 57/00 |
| 2019/0016311 | A1 * | 1/2019 | Poteat | B32B 3/02 |
| 2020/0206784 | A1 | 7/2020 | Rudofski | |
| 2022/0288648 | A1 * | 9/2022 | Allouche | H02S 40/10 |
| 2023/0330708 | A1 * | 10/2023 | Jones | A47L 13/16 |
| 2023/0381608 | A1 * | 11/2023 | Roll | A63B 57/60 |

* cited by examiner

SPORTS TOWEL WITH INTEGRAL SQUEEGEE WIPING SURFACE

CROSS-REFERENCE TO RELATED APPLICATIONS

This application claims the benefit of U.S. Provisional Patent Application No. 63/321,912 titled "TOWEL WITH INTEGRAL SQUEEGEE WIPING SURFACE," filed by the inventor herein on Mar. 21, 2022, the specification of which is incorporated herein by reference in its entirety.

FIELD OF THE INVENTION

This invention relates generally to sports towels, and more particularly to a sports towel for sporting equipment that may be easily carried by an athlete during athletic activities and that may be useful in enabling a helmeted player to wipe moisture off of a helmet visor.

BACKGROUND

Various sports require that players wear a helmet to protect their head from injury during a game. In many instances, such helmets may be quipped with a visor or eye shield affixed to a face mask of the helmet to protect players from glare or eye injury. However, during game play, it can be difficult for a player to keep the visor clean and dry. For example, moisture and dirt from the field may accumulate on the visor, in turn leading to impaired visibility, decreased performance in the game, and even increased possibility of injury. While some players or team staff may use traditional towels to wipe a player's visor, they may tend to smear dirt and streak moisture instead of cleaning the visor as intended. Moreover, if the towel is carried by the player during game play, it may be difficult for the player to access in the heat of the game, and even more difficult to place back in an unobtrusive location after it has been used.

Thus, there remains a need in the art for a sports towel that is more easily accessible and stored by a player during game play, and that is more effective in clearing moisture and dirt from a player's visor during the heat of game play.

SUMMARY OF THE INVENTION

Disclosed is a sports towel having an integral squeegee wiping surface formed of a semi-rigid material that extends along the entire length of one edge of the towel. In accordance with certain features of an exemplary embodiment, the towel is sewn to the squeegee tab along a double stitch that extends through a folded-over edge of the towel and a towel-receiving slot on the top face of the squeegee tab. In accordance with further features of an exemplary embodiment, an indicia-receiving slot is also provided on the top side of the squeegee tab that may receive product branding, a logo, or other indicia. The squeegee tab has a tapered outer edge (along an edge opposite to the towel) that is useful for wiping a planar surface, such as a visor on a sports helmet, such as a football helmet. In use, such a sports towel may be used to initially use the squeegee tab to wipe moisture, dirt, or other materials from the player's visor, and thereafter the towel may be used to dry the player's visor.

In exemplary configurations, the towel may be formed of a soft, absorbent material that is suitable for wiping moisture from a surface, such as a helmet visor, which may include by way of non-limiting example cotton, microfiber, polyester, or a blend of various natural and/or synthetic materials suitable for wiping and absorbing moisture. Likewise in exemplary configurations, the squeegee tab may be formed of a semi-rigid material that is durable and resistant to breaking or excessive bending, such as by way of non-limiting example plastic, rubber, or a polymer or composite material that is flexible enough to bend to flatten against a player's visor, while firm enough to effectively remove moisture and other contaminants from the visor. Still further in exemplary configurations and to add to the ease of attachment, detachment, and carrying of the towel by a player, the towel may include sections of hook-and-loop material, one on an end of the towel opposite the squeegee tab and another on an intermediate portion of the towel, allowing the towel to form a loop for ready attachment to a portion of a player's uniform.

A sports towel configured in accordance with certain aspects of the invention provides a convenient and effective way for an athlete to wipe moisture, dirt, and other contaminants from their helmet visor during game play, with the indicia-receiving slot allowing for product branding or other indicia to be displayed on the squeegee tab of the integrated towel, thus offering an additional marketing opportunity for manufacturers or other entities.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. Furthermore, the use of the terms a, an, etc. does not denote a limitation of quantity, but rather denotes the presence of at least one of the referenced item.

The use of the terms “first”, “second”, and the like does not imply any particular order, but they are included to identify individual elements. Moreover, the use of the terms first, second, etc. does not denote any order of importance, but rather the terms first, second, etc. are used to distinguish one element from another. It will be further understood that the terms “comprises” and/or “comprising”, or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

Figure 1:
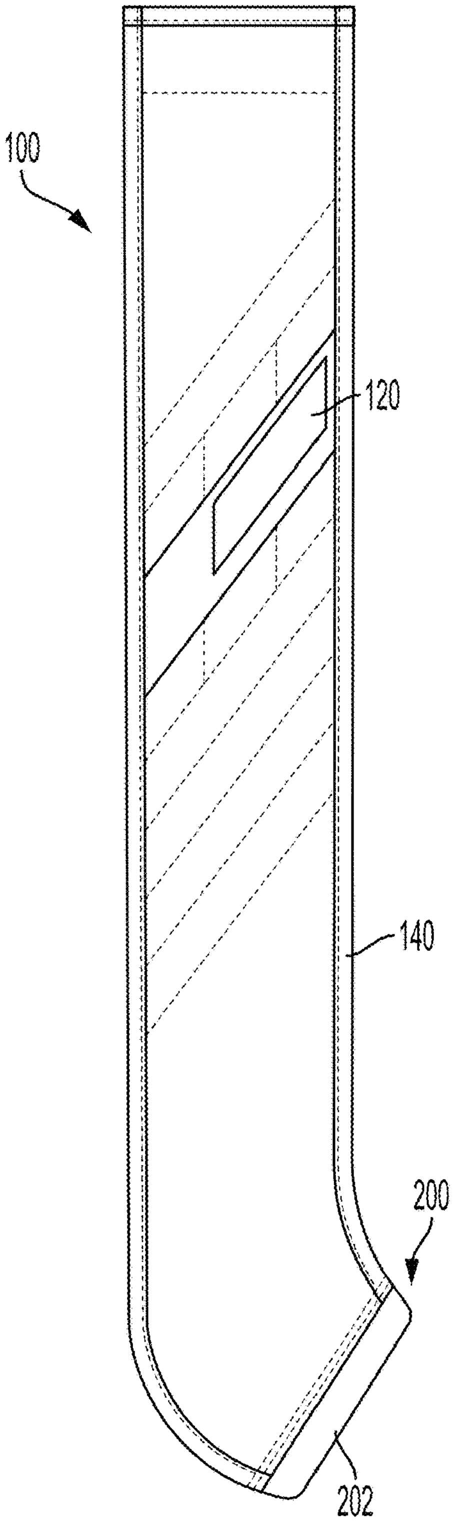
FIG. 1 is a front view of a sports towel with an integrated squeegee tab in accordance with certain features of an embodiment of the invention.
Figure 2:
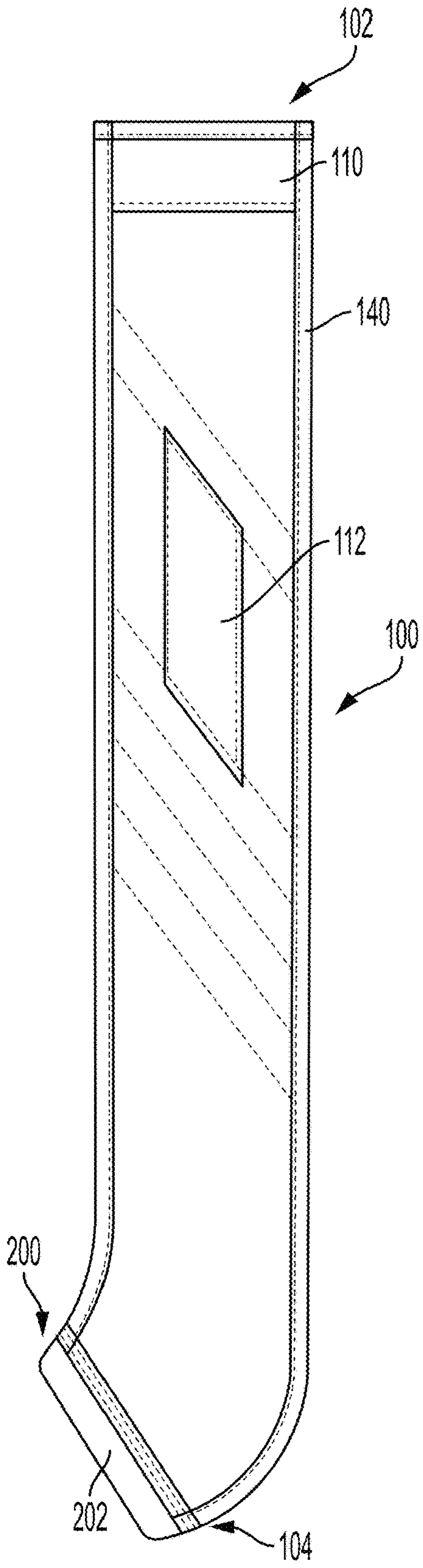
FIG. 2 is a rear view of the sports towel of FIG. 1.
Figure 3:
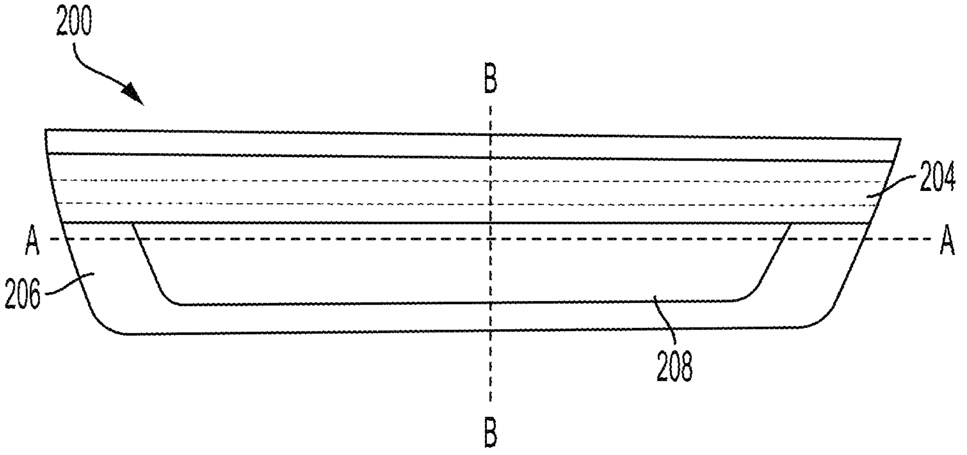
FIG. 3 is a close-up top view of a squeegee tab for use with the sports towel of FIG. 1.
Figure 4:
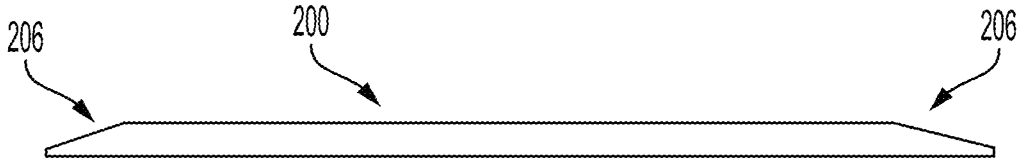
FIG. 4 is a side, cross-sectional view of the squeegee tab of FIG. 3 along section line A-A.
Figure 5:
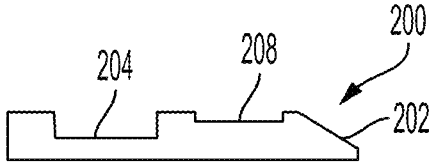
FIG. 5 is a side, cross-sectional view of the squeegee tab of FIG. 3 along section line B-B.
Figure 6:
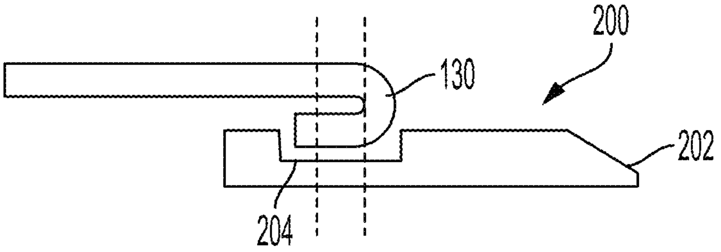
FIG. 6 is an end view of the squeegee tab of FIG. 3 showing attachment of towel 100 to the squeegee tab.

As shown in FIGS. 1 and 2 and in accordance with certain aspects of an embodiment of the invention, a sports towel with an integrated squeegee tab is shown generally at 100. Towel 100 has a first end 102 and a second end 104 opposite the first end 102. In a particular, exemplary configuration, second end 104 of towel 100 may curve away from a longitudinal axis extending from first end 102 through most of the length of towel 100 towards second end 104. A squeegee tab 200 is integrated with second 104 of towel 100 and defines a wiping squeegee blade 202 at the distal, free end of squeegee tab 200. Squeegee tab 200 has a maximum width of preferably between 3 and 4 inches, making it particularly well-suited for wiping a visor of, by way of non-limiting example, a visor on a football player’s helmet.

Towel 100 may be formed of a soft cloth material similar to previously known towels used for drying items or persons, and may in a particularly preferred embodiment comprise quick-drying terry cloth, which is readily commercially available. Likewise, towel 100 may be formed of other readily commercially available soft, absorbent materials that are suitable for wiping moisture from a surface, such as a helmet visor, which materials may be readily selected by those skilled in the art and may include, by way of non-limiting example, cotton, microfiber, polyester, and/or blends of various natural and/or synthetic materials suitable for wiping and absorbing moisture.

It may be desirable to configure such towels so that they may be temporarily affixed to a player’s equipment or clothing, such as by wrapping around a player’s belt or other portion of their uniform for easy attachment to, carrying by, and removal from a portion of the player’s uniform when needed. However, it is important that any such fixation devices be easily and quickly connectable and detachable to ensure that a player is able to quickly remove the towel 100, use both the towel surface and the squeegee tab 200 where and when needed, and immediately replace the towel 100 around the player’s belt or other clothing or attachment point, even when the player is wearing gloves. To aid in such ease of attachment and detachment, towel 100 includes a first portion of hook and loop fastening material 110 (FIG. 2) extending across the full width of towel 100 between edge seams at the first end 102 on the back side of towel 100. Likewise, a second, mating portion of hook and loop fastening material 112 is provided extending lengthwise along towel 100 parallel to a longitudinal axis of towel 100 and perpendicular to first portion of hook and loop fastening material 110, again on the back side of towel 100. Such configuration of mating sections of hook and loop fastening material allows the user to form a loop in towel 100 having a modifiable configuration that is best suited to the user’s current clothing or other equipment.

On a front face of towel 100 (FIG. 1) and on the side that is opposite from the mating sections of hook and loop fastening material 110 and 112, an indicia panel 120 may be provided having a surface on which a notation may be made, such as by printing with a pen, marker or the like (such as the player’s name, number, their locker number, or the like). Indicia panel 120 is preferably affixed to towel 100 only at its outer edges along the side edge seams of towel 100.

Next and with reference to the detail views of squeegee tab 200 of FIGS. 3-6, squeegee tab 200 includes a towel loop receiver 204 that aids in connecting to second end 104 of towel 100 in a manner that keeps the top face of squeegee tab 200 close to if not aligned with the top surface of towel 100. As best viewed in FIG. 6, towel loop receiver 204 comprises a groove that extends the full width of the top face of squeegee tab 200. During manufacture, second end 104 of towel 100 is folded to form towel loop 130 which is inserted into towel loop receiver 202, and is then stitched in place to towel loop receiver 202 to form a permanent connection (such as through use of a double fastening stitch). Preferably, a binding 140 (FIGS. 1 and 2) may extend around the entire cloth portion of towel 100, including extending over towel loop 130 so as to protect the outer peripheral edges of towel 100 from fraying. As best viewed in FIGS. 5 and 6, the distal, free end of squeegee tab 200 forms squeegee blade 202 having a downwardly angled top face and a flat, planar bottom face, thus providing a scraping-type, semi-rigid wiping surface suitable for wiping moisture from a flat surface, such as the visor on a player’s helmet. As best viewed in FIG. 4, side edges 206 of squeegee tab 200 preferably angle downward from the top face to the bottom face of squeegee tab 200. Likewise and as best viewed in the top view of FIG. 3, side edges 206 of squeegee tab 200 preferably angle inward from the back edge to the front edge of squeegee tab 200.

Further, squeegee tab 200 may include an indented indicia panel 208 in the top face of squeegee tab 200, which indicia panel may receive a printed message or indicia, an embossed or debossed message or indicia, or such otherwise configured printed messages or indicia as will occur to those skilled in the art, in each case without increasing the maximum thickness profile of squeegee tab 200.

In an exemplary configuration, squeegee tab 200 may be formed from any number of different materials, such as by way of non-limiting example resilient polymeric material such as silicon, latex, rubber, plastic, polyurethane and/or other polymers or a combination thereof. Likewise, squeegee tab 200 may be formed from a material or materials that can be molded to result in a squeegee tab 200 having a hardness value in a range of 10 to 100 Shore A. Squeegee tab 200 is thus preferably formed of a semi-rigid material that is durable and resistant to breaking or excessive bending, and that is flexible enough to bend to flatten against a player's visor, while firm enough to effectively remove moisture and other contaminants from the visor.

A sports towel configured in accordance with at least certain aspects of the foregoing description will provide a convenient and effective way for an athlete to wipe moisture, dirt, and other contaminants from their helmet visor during game play. Moreover, the indicia-receiving slot of the squeegee tab may simultaneously allow for product branding or other indicia to be displayed on the squeegee tab of the integrated towel, thus offering an additional marketing opportunity for manufacturers or other entities.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A sports towel having an integral squeegee wiping surface, comprising:

a towel portion having a first end and a looped-over second end opposite the first end; and a squeegee tab extending along an entire width of the second end of the towel portion, said squeegee tab having a towel-loop receiver defined by a groove extending across an entire width of the squeegee tab, wherein said looped-over second end of said towel portion is affixed to said towel-loop receiver on said squeegee tab;

wherein said squeegee tab further comprises a tapered distal edge forming a wiping blade.

2. The sports towel of claim 1, said towel portion having a front face extending from the first end to the second end, and a back face extending from the first end to the second end, said towel portion further comprising an indicia panel extending across a portion of the front face of the towel portion.

3. The sports towel of claim 2, further comprising a first section of hook-and-loop material extending laterally across a portion of the back face of the towel portion at said first end of the towel portion, and a second section of hook-and-loop material extending longitudinally across a portion of the back face of the towel portion that is between the first end of the towel portion and the second end of the towel portion, wherein the second section of hook-and-loop material is configured to detachably connect to said first section of hook-and-loop material.

4. The sports towel of claim 1, wherein a longitudinal axis is defined along said towel portion extending from said first end along a length of said towel portion toward said second end, wherein said second end of said towel portion curves away from said longitudinal axis.

5. The sports towel of claim 1, wherein said squeegee tab is formed of a material providing a hardness value to said squeegee tab in a range of 10 to 100 Shore A.

6. The sports towel of claim 1, wherein said squeegee tab has a width dimension of between 3 and 4 inches.

7. The sports towel of claim 1, said squeegee tab further comprising an indicia panel on a top face of said squeegee tab adjacent said towel-loop receiver and configured to receive and display indicia on said squeegee tab.

8. The sports towel of claim 7, said indicia panel further comprising an indented planar portion on the top face of said squeegee tab.

9. The sports towel of claim 1, said towel portion further comprising a binding extending around an entire perimeter of said towel portion including an entirety of said looped-over second end of said towel portion.

10. The sports towel of claim 1, wherein said second end of said towel portion forms a looped-over portion of said towel portion, and wherein said towel portion further comprises a binding extending around an entire perimeter of said towel portion including an entirety of said looped-over portion, wherein said looped-over portion is affixed to said squeegee tab along said channel.

11. A sports towel having an integral squeegee wiping surface, comprising:

a towel portion having a first end and a second end opposite the first end; and a squeegee tab extending along an entire width of the second end of the towel portion, said squeegee tab having a groove extending into a top face of the squeegee tab and extending across an entire width of the squeegee tab, and an intended indicia panel in said top face of the squeegee tab extending parallel to said channel;

wherein said second end of said towel portion is affixed to said squeegee tab along said channel.

12. The sports towel of claim 11, said towel portion having a front face extending from the first end to the second end, and a back face extending from the first end to the second end, said towel portion further comprising an indicia panel extending across a portion of the front face of the towel portion.

13. The sports towel of claim 12, further comprising a first section of hook-and-loop material extending laterally across a portion of the back face of the towel portion at said first end of the towel portion, and a second section of hook-and-loop material extending longitudinally across a portion of the back face of the towel portion that is between the first end of the towel portion and the second end of the towel portion, wherein the second section of hook-and-loop material is configured to detachably connect to said first section of hook-and-loop material.

14. The sports towel of claim 11, wherein a longitudinal axis is defined along said towel portion extending from said first end along a length of said towel portion toward said second end, wherein said second end of said towel portion curves away from said longitudinal axis.

15. The sports towel of claim 11, wherein said squeegee tab further comprises a tapered distal edge forming a wiping blade.

16. The sports towel of claim 15, wherein said squeegee tab is formed of a material providing a hardness value to said squeegee tab in a range of 10 to 100 Shore A.

17. The sports towel of claim 15, wherein said squeegee tab has a width dimension of between 3 and 4 inches.

18. The sports towel of claim 15, said squeegee tab further comprising an indicia panel on a top face of said squeegee tab adjacent said towel-loop receiver and configured to receive and display indicia on said squeegee tab.

19. The sports towel of claim 18, said indicia panel further comprising an indented planar portion on the top face of said squeegee tab.

* * * * *